(12) United States Patent
Ingendahl

(10) Patent No.: US 8,783,445 B2
(45) Date of Patent: Jul. 22, 2014

(54) UPPER-STRAND WELL FOR A TROUGH PAN AND TROUGH PAN HAVING SUCH AN UPPER-STRAND WELL

(75) Inventor: Jurgen Ingendahl, Wermelskirchen (DE)

(73) Assignee: Caterpillar Global Mining Europe GmbH, Lunen (DE)

( * ) Notice: Subject to any disclaimer, the term of this patent is extended or adjusted under 35 U.S.C. 154(b) by 260 days.

(21) Appl. No.: 13/377,222

(22) PCT Filed: Jun. 7, 2010

(86) PCT No.: PCT/IB2010/052521
§ 371 (c)(1),
(2), (4) Date: Dec. 9, 2011

(87) PCT Pub. No.: WO2010/143123
PCT Pub. Date: Dec. 16, 2010

(65) Prior Publication Data
US 2012/0080289 A1 Apr. 5, 2012

(30) Foreign Application Priority Data
Jun. 10, 2009 (DE) .................... 20 2009 004 911 U

(51) Int. Cl.
*B65G 19/28* (2006.01)
*E21F 13/06* (2006.01)

(52) U.S. Cl.
USPC .................................... 198/735.2; 198/735.1

(58) Field of Classification Search
USPC .............. 198/734, 735.1, 735.2, 735.3, 735.4
See application file for complete search history.

(56) References Cited

U.S. PATENT DOCUMENTS

| | | | | |
|---|---|---|---|---|
| 3,944,061 A | * | 3/1976 | Braun et al. | 198/735.2 |
| 3,946,860 A | * | 3/1976 | Krohm et al. | 198/735.6 |
| 4,282,968 A | * | 8/1981 | Temme | 198/735.2 |
| 4,359,154 A | * | 11/1982 | Temme | 198/735.2 |
| 4,624,362 A | | 11/1986 | Temme et al. | |
| 4,667,811 A | * | 5/1987 | Schoop et al. | 198/735.3 |

(Continued)

FOREIGN PATENT DOCUMENTS

| | | |
|---|---|---|
| DE | 3405986 A1 | 8/1985 |
| DE | 3909947 | 3/1989 |

(Continued)

OTHER PUBLICATIONS

English translation of International Preliminary Report on Patentability dated Dec. 12, 2011 in corresponding International Patent Application No. PCT/IB2010/052521, filed Jun. 7, 2010.

*Primary Examiner* — Douglas Hess
(74) *Attorney, Agent, or Firm* — Foley & Lardner LLP

(57) ABSTRACT

A trough pan with an upper strand trough and to an upper strand trough for a trough pan of a scraper chain conveyor, with two side profiles, and with a trough bottom. The trough bottom has two side edges and two end edges which have at least partially a wavy boundary line and which are provided at the transition of a top side into the end edge with a chamfer having a chamfer angle. In order to improve the upper strand troughs and the trough pans equipped with these in terms of the problem of the penetration of fine coal into the intermediate gap of the bearing region between the trough bottom and intermediate bottom, the end edges are provided with a bevel between the chamfer and an underside, the bevel sloping more steeply than the chamfer.

20 Claims, 2 Drawing Sheets

(56) References Cited

U.S. PATENT DOCUMENTS

| | | | |
|---|---|---|---|
| 4,735,304 A * | 4/1988 | Schoop et al. | 198/735.3 |
| 5,224,582 A * | 7/1993 | Hahn et al. | 198/735.6 |
| 5,871,261 A * | 2/1999 | Bandy et al. | 299/43 |
| 6,267,449 B1 | 7/2001 | Meya et al. | |
| 6,401,912 B1 * | 6/2002 | Bandy, Jr. | 198/735.4 |
| 6,896,121 B2 * | 5/2005 | Vorsteher et al. | 198/735.2 |
| 6,966,429 B2 * | 11/2005 | Vorsteher et al. | 198/735.6 |
| 7,032,743 B2 | 4/2006 | Vorsteher et al. | |
| 8,365,901 B2 * | 2/2013 | Schmidt et al. | 198/735.6 |
| 2002/0074214 A1 | 6/2002 | Klabisch et al. | |
| 2003/0213676 A1 | 11/2003 | Vorsteher et al. | |
| 2006/0244302 A1 | 11/2006 | Siepenkort et al. | |

FOREIGN PATENT DOCUMENTS

| | | |
|---|---|---|
| DE | 3903347 A1 | 8/1990 |
| DE | 9313677.3 U1 | 1/1994 |
| DE | 19844052 C1 | 9/2000 |
| DE | 10050701 A1 | 5/2002 |
| DE | 10222598 A1 | 11/2003 |
| DE | 202005004383 U1 | 6/2005 |
| EP | 1362807 A2 | 11/2003 |
| GB | 2163398 A | 2/1986 |

* cited by examiner

UPPER-STRAND WELL FOR A TROUGH PAN AND TROUGH PAN HAVING SUCH AN UPPER-STRAND WELL

The invention relates to an upper strand trough for a trough pan of a scraper chain conveyor, in particular a longwall conveyor for mining use, with two side profiles and with a trough bottom which connects these side profiles and has two side edges, to which the side profiles run essentially parallel, and two end edges, which are designed to be complementary to one another and have at least partially a wavy boundary line and which are provided at the transition of a top side of the trough bottom into the end edge with a chamfer having a chamfer angle. The invention relates, furthermore, to a trough pan for scraper chain conveyors, with an upper strand trough which is composed of two side profiles and of a trough bottom having two side edges and two end edges, the opposite end edges being formed complementarily to one another, having at least partially a wavy boundary line and being provided at the transition of a top side of the trough bottom into the end edge with a chamfer having a chamfer angle, and with a supporting structure for the upper strand trough, said supporting structure comprising interconnected side cheeks which delimit a lower strand and are connected via an intermediate bottom which forms a bearing surface for the trough bottom of the upper strand trough and has terminal edges which in the assembled state lie offset to the end edges of the trough bottom, in order to provide overlapping regions of the intermediate bottom, on the one hand, and of the trough bottom, on the other hand, in the joint region of two adjacent trough pans.

BACKGROUND OF THE INVENTION

A generic upper strand trough for a generic trough pan is known from DE 102 22 598 A1. A wavy contour of the boundary line at the end edge of the trough bottom, on the one hand, and an associated wavy and preferably offset profile of the intermediate bottom, on the other hand, not only achieve a uniform run of the scrapers guided in the upper strand over the joint region, but at the same time ensure that sufficient angular movability is guaranteed even when two adjacent trough pans stand offset to one another by the amount of the maximum anglings permitted by trough pan connection means, such as, in particular, toggles.

When an exchangeable upper strand trough supported on an intermediate bottom has been in operational use for a lengthy period, sometimes considerable accumulations of fine coal appear in the gap at the joint between the trough plates of adjacent upper strand troughs, and this fine coal may be additionally compacted as a result of the movement of the scrapers and in adverse cases may even infiltrate between the trough bottom and intermediate bottom. In some rare cases, it has already been observed that the subsequent creep of fine coal in the joint gap between adjacent trough bottoms causes the upper strand troughs to be raised in relation to the intermediate bottom, with the result that the forces upon locking devices for the upper strand troughs increase considerably and, furthermore, it becomes considerably more difficult to release the upper strand trough for inspection or repair purposes. To mitigate this problem, it has already been proposed to provide fine coal passages in the intermediate bottom, so that fine coal, insofar as it accumulates between the trough bottom and intermediate bottom, can fall through the holes downward into the lower strand.

SUMMARY OF THE INVENTION

An object of the invention is to improve upper strand troughs and trough pans equipped with these in such a way that the problem of the penetration of fine coal into the intermediate gap of the bearing region between the trough bottom and intermediate bottom is as far as possible avoided and, to that extent, the known problems can no longer arise.

This object and others are achieved according to the invention, in an upper strand trough or in a trough pan having such an upper strand trough, in that the end edges of the trough bottoms are provided, between the chamfer and an underside of the upper strand trough, with a bevel having a bevel angle, the bevel sloping more steeply than the chamfer. The additional bevel of the respective end edge of the trough bottoms and the steeper run of this bevel achieve, at the joint gap between adjacent trough pans, an upwardly directed opening angle which surprisingly affords a self-cleaning effect for the joint gap, since, due to the additional bevel, fine coal tends more readily to creep out of the gap than to pass further downward in the gap and subsequently into the intermediate gap between the trough bottom and intermediate bottom. This surprising self-cleaning effect is also assisted by the driving action of the scrapers running past, since these can tear a narrow downwardly tapering fine coal wedge more easily out of the joint gap produced according to the invention than a fine coal accumulation which does not taper or which tapers only in the region of the chamfer.

According to an advantageous refinement, the bevel may extend as far as the underside of the trough bottom. This measure is provided especially advantageously in the case of upper strand troughs newly to be produced, in which the exact dimensions of the trough bottom are fixed before the chamfer and the bevel are made. Alternatively, the bevel may extend only partially over the depth of the end edge, and a straight edge portion which runs at right angles to the underside of the trough bottom may be formed between the underside of the latter and a limiting edge of the bevel. The depth of the straight edge portion may lie at about $\frac{1}{10}$ to $\frac{1}{20}$ of the initial thickness of the trough bottom in relation to the sheet metal thickness of the latter and may amount, for example, to about 1 to 4 mm, depending on the initial thickness of the trough bottom. A configuration of the end edge with a chamfer, a bevel and a narrow straight edge portion is appropriate particularly when exchange troughs which are already in use are reconditioned as upper strand troughs in which the end edges in any case already showing signs of wear because of the permanent overrun of the scrapers and, to that extent, it cannot be ensured that a uniform bevel can be provided, in particular burnt out, subsequently as far as the underside of the trough bottom.

The bevel and the chamfer are preferably formed identically and with identical size on the two opposite end edges of a trough bottom. In operational use underground, however, the situation may arise where, on the one hand, a new upper strand trough and, on the other hand, a reconditioned upper strand trough butt directly with their end edges one against the other. In such a case, a bevel which is continuous as far as the underside could then lie opposite a bevel having a straight edge portion.

The boundary line at the end edges is preferably provided with a central curved zone and, on the outside, with multiply angled zones, in order to ensure good angular movability of adjacent trough pans or upper strand troughs with respect to one another.

In a trough pan according to the invention, in addition to the measures according to the invention taken on the upper strand trough, further structural variations will be carried out in order to improve overall the service life of the trough pan. Thus, according to an advantageous refinement, the intermediate bottom may be provided, near its terminal edges, partially with clearances or holes, as has already been tried out per se, although substantially less fine coal has to be discharged into the lower strand via the clearances or holes that are also provided than in the prior art, since the bulk of the fine coal material accumulating in the gap creeps upward out of the joint gap as a result of the self-cleaning effect. The clearances are preferably composed of oval long holes arranged transversally to the running direction of the scrapers or approximately parallel to the end edge. Also preferably, the intermediate bottom may be provided on one side with a flattening which reaches as far as the terminal edge and via which, in particular, the angling of two adjacent trough pans in basins is improved, since there is then a lower risk that the trough bottom of one trough pan lies on the intermediate bottom of the following trough pan. In this refinement, it is advantageous particularly if the clearances or holes are formed only in that portion of the intermediate bottom which adjoins the flattening and/or if the number of holes or clearances is greater in the portion behind the flattening than near the other terminal edge of the intermediate bottom without a flattening. Furthermore, as is known per se, the intermediate bottom may be provided with an inspection orifice, and, beneath the trough bottom, a sheet metal piece is welded on which, in the assembled state, fits positively into the inspection orifice, in order to lock the upper strand trough forming an exchange trough positively in the direction of movement of the scrapers as a result of the interaction of the sheet metal piece and inspection orifice and to relieve the additionally provided locking means, such as locking noses, on the side edges of the upper strand trough.

These and other objects, aspects, features, developments and advantages of the invention of this application will become apparent to those skilled in the art upon a reading of the Detailed Description of Embodiments set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DETAILED DESCRIPTION OF EMBODIMENTS

Figure 1:
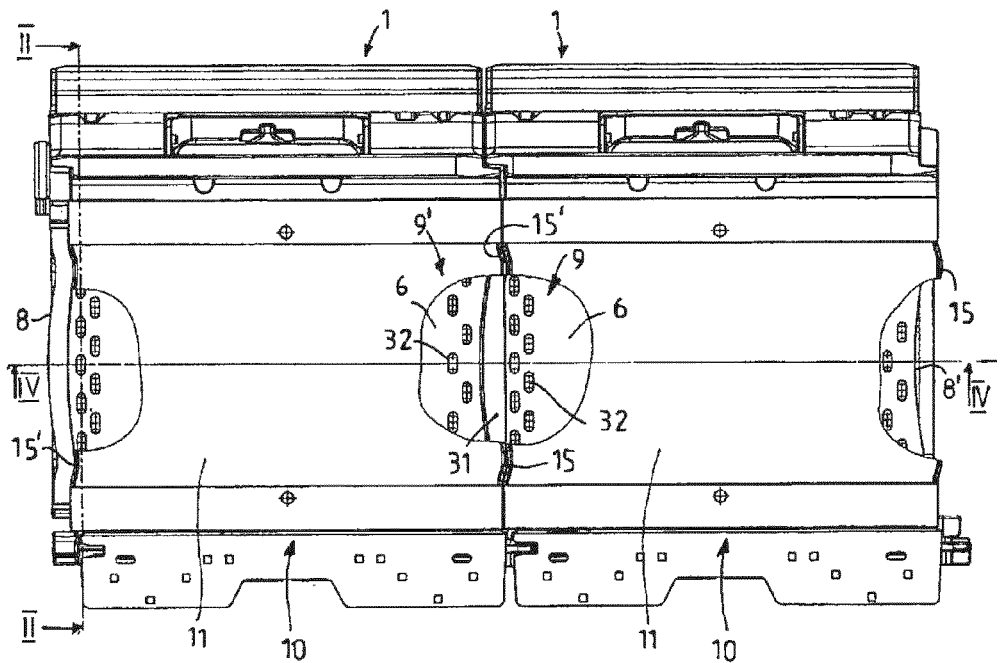
FIG. 1 shows two trough pans designed according to the invention with an attached planar guide in a top view, partially cut away.
Figure 2:
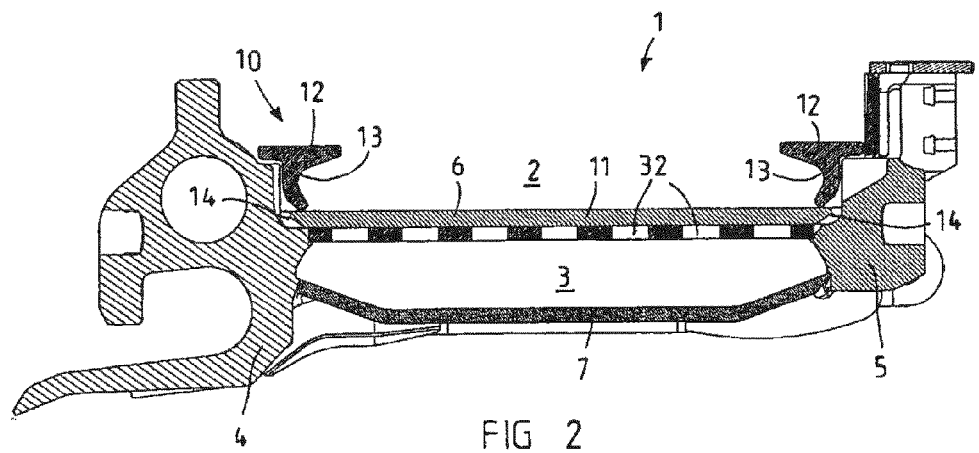
FIG. 2 shows a sectional view along II-II in FIG. 1.
Figure 4:
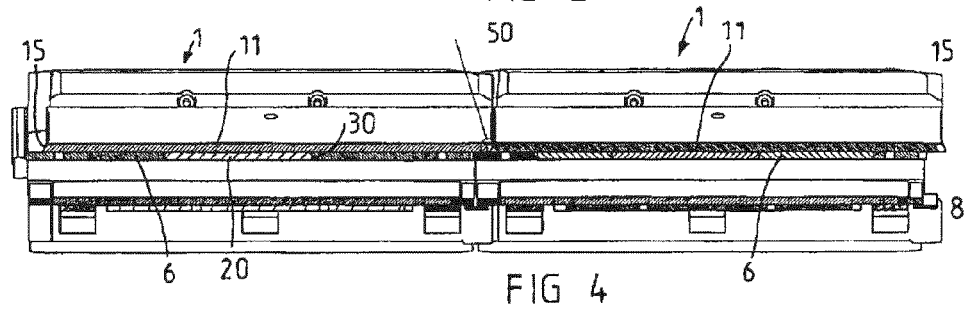
FIG. 4 shows the two trough pans from FIG. 1 in a sectional view along IV-IV in FIG. 1.

Referring now to the drawings wherein the showings are for the purpose of illustrating preferred and alternative embodiments of the invention only and not for the purpose of limiting same, FIGS. 1 to 4 show a trough pan according to the invention is designated in each case by reference symbol 1. A scraper chain conveyor, such as is installed, for example, in the underground longwall face of a coal mining plant, is mostly composed of a multiplicity of, for example more than 200, identically constructed trough pans 1, at the end of which drive troughs are positioned, in order to move a rotating scraper belt with connected scrapers (not illustrated) in an upper strand 2 of the individual trough pans 1 in one direction and to return it by rotation in the lower strand 3. As may be gathered clearly particularly from FIG. 2, in the exemplary embodiment shown the trough pan 1 is composed of a first side cheek 4, which has here at the same time integrally a planar guide and which is constructed as a complicated casting, and of a second side cheek 5 which is considerably reduced in relation to the side cheek 4 and in operational use is positioned on the stowage side, the two side cheeks 4, 5 being connected essentially rigidly to one another, on the one hand, via an intermediate bottom 6 and, on the other hand, via a lower strand bottom 7. The exemplary embodiment shown for the two side cheeks 4, 5 and the positioning and arrangement of the intermediate bottom 6 and lower strand bottom 7 is only one example of a trough pan, and the individual parts could be constructed basically differently or, such as, for example, the lower strand bottom 7, could even be dispensed with, depending on the set-up and intended use of a trough pan.

An upper strand trough 10 is supported on the intermediate bottom 6 connecting the side cheeks 4, 5 and is composed in a way known per se of a planar trough bottom 11 and of two side profiles 12 which, facing one another, have a profile contour 13 on which the scrapers, not shown, can be guided with their scraper ends. Each upper strand trough (exchange trough) 10 has two side edges (14, FIG. 2) which run essentially parallel to the side profiles 12, and, furthermore, two opposite end edges 15, 15' which, as shown particularly in the top view in FIG. 1, both have a wavy boundary line, the end edges 15 and 15' being formed complementarily to one another, so that, in the assembled state, a protuberance on, for example, the end edge 15 fits into an indentation on the end edge 15', and vice versa. In each case between the two trough bottoms 11 of the upper strand troughs 10 of adjacent trough pans 1, a joint region or joint gap 50 is obtained, which, because of the wavy profile of the end edges 15, 15', can be run over by scrapers of the scraper chain, without the scrapers butting against the end edges in the joint region. For a sufficient joint gap overlap in each trough pan 1, the terminal edge 8 of the intermediate bottom 6 projects further on one side than the overlying end edge 15' of the trough bottom 11, while, at the opposite end of the trough pan 1, the corresponding terminal edge 8' is offset inward (set back), this being evident especially clearly from FIG. 4. In order to ensure angular movability, the terminal edges 8, 8' of the intermediate bottom also have a wavy boundary line, in which case the wavy contour may be similar or identical to the wavy contour of the end edges 15, 15' of the trough bottoms 11 and preferably having a central curved zone and zones multiply angled at the margin, as can be seen clearly in FIGS. 1 and 3.

Figure 5:
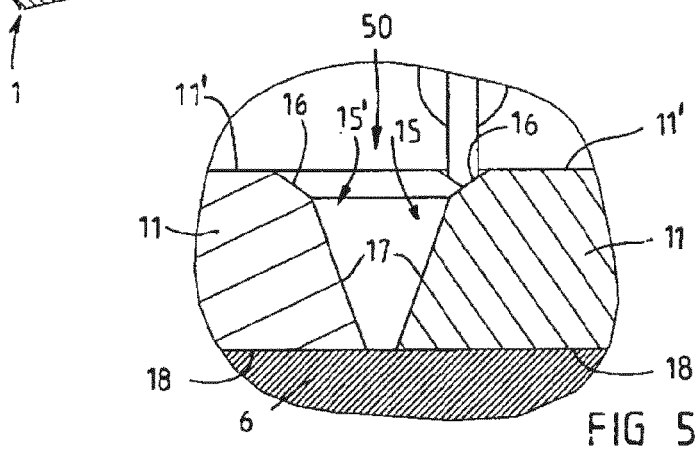
FIG. 5 shows the joint gap between two adjacent trough bottoms according to a first exemplary embodiment.

According to the invention, both end edges 15, 15' of the trough bottoms 11 have in addition to a chamfer 16 on the transition of the top side 11' into the end edge 15 a bevel 17 which, as illustrated in detail in FIG. 5, according to an especially advantageous refinement in the case of newly produced upper strand troughs 10, extends continuously as a slope as far as the underside 18 of the trough bottom 11. Consequently, in the overall joint gap 50 between the two trough bottoms 11, an upwardly opening V-shaped gap is formed, which at the same time reaches as far as the intermediate bottom 6 of the trough pan, consequently as far as the overlap zone. The chamfer 16 has here a chamfer angle which is angled in relation to the top side 11' of the trough bottom 11 at an angle of 45° and may generally lie between about 25° and 50°. In relation to the overall thickness of the trough bottom 11 of about 40 mm here, the chamfer 16 extends over a depth of 5 mm here. The chamfer 16 has a directly adjoining it the bevel 17 with a bevel angle which is larger, in particular markedly larger, than the chamfer angle and gives rise to a substantially steeper run of the bevel 17 than the chamfer 16. In the especially preferred refinement, the bevel angle of the bevel 17 is around 70° in relation to the top side 11' and extends with a uniform bevel angle as far as the underside 18.

Figure 6:
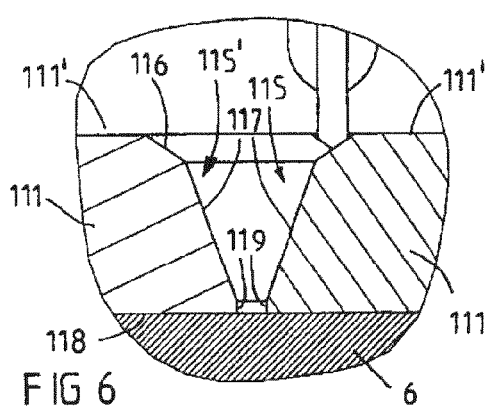
FIG. 6 shows the joint gap between adjacent trough bottoms according to a second exemplary embodiment.

FIG. 6 shows an alternative exemplary embodiment with trough bottoms 111 having a chamfer 116 with the same dimensions as in the previous exemplary embodiment and with a bevel 117 which does not extend as far as the underside 118 of the trough bottoms 111, but instead terminates at a distance of about 2 mm here from the underside 118, since between the underside 118 and the bevel 117 a straight edge portion 119 is also located, at which the end edges 115' and 115 run perpendicularly to the top side 111' or underside 118 of the trough bottoms 111. Such a configuration is appropriate especially when upper strand troughs are repaired after prior use.

Figure 7:
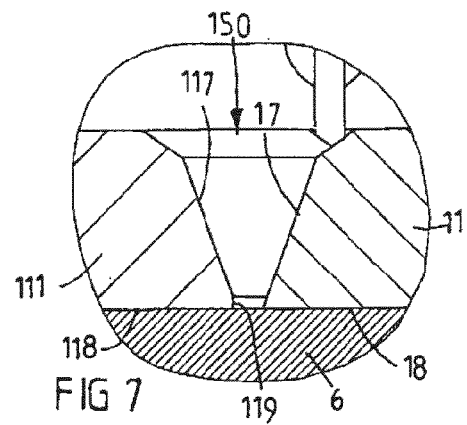
FIG. 7 shows the joint gap between a new and a reconditioned upper strand trough.

FIG. 7 shows a trough joint gap 150 between a trough bottom 111 according to FIG. 6 and a trough bottom 11, FIG. 5. One bevel 17 consequently runs rectilinearly as far as the underside 18, while the other bevel 117 merges first into a straight edge portion 119.

Figure 3:
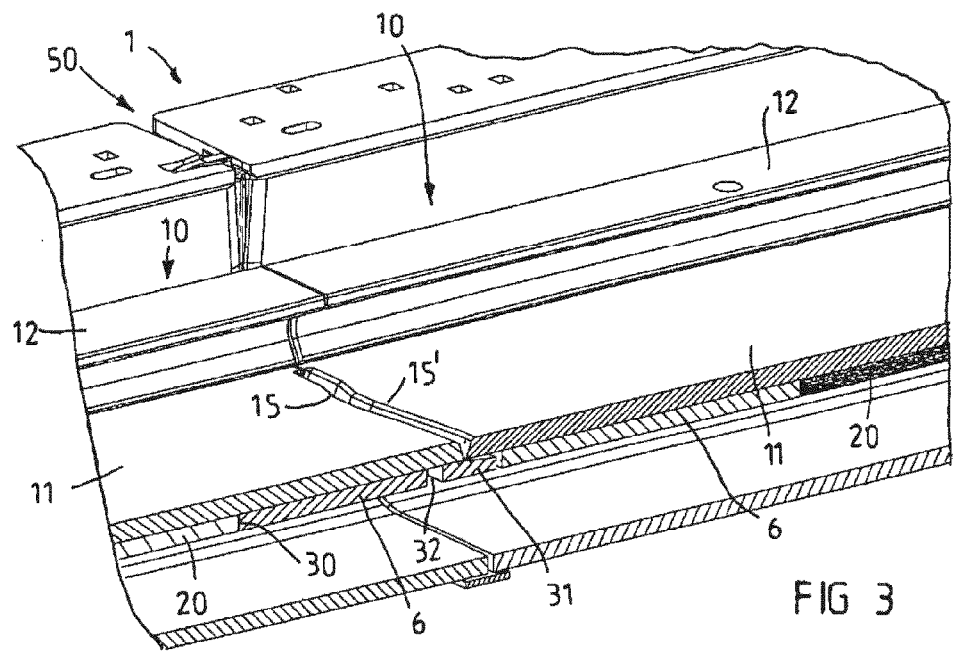
FIG. 3 shows in perspective the joint region between two adjacent trough pans, partially cut away.

It is clear, furthermore, from FIGS. 1 and 3 that the intermediate bottom 6 is designed in each case near the terminal edges with rows 9 and 9' of here elongate oval long holes 32 extending transversally to the running direction of the scrapers. The density of the long holes 32 in the row 9 at that terminal edge 8 of the intermediate bottom 6 which is covered in the assembled state by the overlying trough bottom 11 is higher than the density in the row 9' which lies at the set-back terminal edge 8' of the intermediate bottom 6. As shown especially clearly in FIG. 3, between the row 9 of long holes 32 of higher number and the associated terminal edge 8, a flattening 31 is formed, which tapers the intermediate bottom 6 slightly towards the terminal edge 8 in order to improve angular movability in the vertical. Since the flattening 31 increases the risk of an accumulation of fine coal in the intermediate gap, the higher number of long holes 32, which run basically parallel to the terminal edge 8, in the row 9 serves at the same time as a barrier for the fine coal which cannot creep any further under the intermediate gap. Furthermore, it can be gathered clearly from FIG. 3 that in each case sheet metal pieces 20 are welded to the underside of the individual trough bottoms 11 and in the assembled state fit positively into inspection orifices 30 in the intermediate bottoms 6, in order to anchor the trough bottoms 11 and thereby the entire exchange trough 10 to the substructure, formed by means of the side cheeks 4, 5, and the intermediate bottom 6, in the direction of movement of the scrapers.

The above description gives a person skilled in the art an idea for numerous modifications which are to come within the scope of protection of the accompanying claims. The exemplary embodiments show a chamfer with an angle of 45° and with a depth of 5 mm. Depending on the sheet metal thickness, both the depth of the chamfer and the chamfer angle may vary within limits. The same also applies to the bevel angle which only preferably lies at about 70°. Instead of a rectilinear run of the bevel, a slightly curved or, where appropriate, multiply angled run of the bevel could also be provided, preferably the steepness of the bevel in each case increasing toward the underside. The side cheeks may be composed of castings, plates, welded structures and the like and be designed with or without a guide for mining machines.

Further, while considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. An upper strand trough for a trough pan of a scraper chain conveyor, comprising:
    two side profiles and a trough bottom which connects the two side profiles;
    two side edges and two end edges which are formed complementarily to one another, which have at least partially a wavy boundary line and which are provided at the transition of a top side into the end edge with a chamfer having a chamfer angle;
    wherein the end edges are provided with a bevel between the chamfer and an underside, the bevel sloping more steeply than the chamfer.

2. The upper strand trough as claimed in claim 1, wherein the bevel extends as far as the underside of the trough bottom.

3. The upper strand trough as claimed in claim 1, wherein the bevel extends only partially over the depth of the end edge, and a straight edge portion running at right angles to the underside is formed between the underside and the limiting edge of the bevel.

4. The upper strand trough as claimed in claim 1, wherein at least one of the chamfer angle is between about 25° and 50° and the bevel angle is between about 60° to 80°.

5. The upper strand trough as claimed in claim 4, wherein the chamfer angle is between about 30° or 45°.

6. The upper strand trough as claimed in claim 4, wherein the bevel angle is about 70°.

7. The upper strand trough as claimed in claim 1, wherein the bevel and the chamfer at the two opposite end edges of a trough bottom are of identical size.

8. The upper strand trough as claimed in claim 1, wherein the boundary line has a central curved zone and is provided on an outside with multiply angled zones.

9. A trough pan for scraper chain conveyors, in particular for longwall conveyors for mining use, with an upper strand trough which includes side profiles and a trough bottom having two side edges and two end edges, the opposite end edges being formed complementarily to one another, having at least partially a wavy boundary line and being provided at the transition of a top side of the trough bottom into the end edge with a chamfer having a chamfer angle, and with a supporting structure for the upper strand trough, said supporting structure comprising interconnected side cheeks which delimit a lower strand and are connected via an intermediate bottom which forms a bearing surface for the trough bottom of the upper strand trough and has terminal edges which in the assembled state lie offset to the end edges of the trough bottom, in order to provide overlapping regions in a joint region of two adjacent trough pans, the end edges being provided with a bevel having a bevel angle between the chamfer and an underside of the trough bottom, the bevel sloping more steeply than the chamfer.

10. The trough pan as claimed in claim 9, wherein the bevel extends as far as the underside of the trough bottom.

11. The trough pan as claimed in claim 9, wherein the bevel extends only partially over the depth of the end edge, and a straight edge portion running at right angles to the underside is formed between the underside and the limiting edge of the bevel.

12. The trough pan as claimed in claim 9, wherein at least one of the chamfer angle is between about 25° and 50° and the bevel angle is between about 60° to 80°.

13. The trough pan as claimed in claim 12, wherein the chamfer angle is between about 30° or 45°.

14. The trough pan as claimed in claim 12, wherein the bevel angle is about 70°.

15. The trough pan as claimed in claim 9, wherein the bevel and the chamfer at the two opposite end edges of a trough bottom are of identical size.

16. The trough pan as claimed in claim 9, wherein the boundary line has a central curved zone and is provided at the margin with multiply angled zones.

17. The trough pan as claimed in claim 9, wherein the intermediate bottom is provided, near the terminal edges partially with at least one of clearances and holes.

18. The trough pan as claimed in claim 17, wherein the intermediate bottom is provided on one side with a flattening reaching as far as the terminal edge, the at least one of clearances and holes being formed in that portion of the intermediate bottom which adjoins the flattening.

19. The trough pan as claimed in claim 17, wherein the number of the at least one of holes and clearances is greater in the portion than near the other terminal edge of the intermediate bottom.

20. The trough pan as claimed in claim 9, wherein the intermediate bottom is provided with an inspection orifice, and in that, beneath the trough bottom, a sheet metal piece is welded on which in the assembled state fits positively into the inspection orifice.

* * * * *